United States Patent
Blasinski et al.

(10) Patent No.: US 10,081,352 B2
(45) Date of Patent: Sep. 25, 2018

(54) METHOD FOR OPERATING A NAVIGATION SYSTEM OF A HYBRID MOTOR VEHICLE, AND HYBRID MOTOR VEHICLE

(71) Applicant: Audi AG, Ingolstadt (DE)

(72) Inventors: Boris Blasinski, Gaimersheim (DE); Matthias Kaiser, Ingolstadt (DE)

(73) Assignee: Audi AG, Ingolstadt (DE)

( * ) Notice: Subject to any disclaimer, the term of this patent is extended or adjusted under 35 U.S.C. 154(b) by 34 days.

(21) Appl. No.: 15/504,384

(22) PCT Filed: Oct. 6, 2015

(86) PCT No.: PCT/EP2015/001961
§ 371 (c)(1),
(2) Date: Feb. 16, 2017

(87) PCT Pub. No.: WO2016/055156
PCT Pub. Date: Apr. 14, 2016

(65) Prior Publication Data
US 2017/0232952 A1    Aug. 17, 2017

(30) Foreign Application Priority Data
Oct. 7, 2014    (DE) .......... 10 2014 014 851

(51) Int. Cl.
*B60W 20/12*    (2016.01)
*B60L 15/20*    (2006.01)
(Continued)

(52) U.S. Cl.
CPC .............. *B60W 20/12* (2016.01); *B60K 6/48* (2013.01); *B60L 11/12* (2013.01);
(Continued)

(58) Field of Classification Search
CPC .... B60W 20/12; G01C 21/3415; B60L 15/20; B60L 15/2045; Y02T 10/7258
(Continued)

(56) References Cited

U.S. PATENT DOCUMENTS 6,314,347 B1    11/2001    Kuroda et al.
7,539,562 B2    5/2009    Maguire et al.
(Continued)

FOREIGN PATENT DOCUMENTS

DE    112007000515 T5    1/2009
DE    102012000139 A1    7/2012
(Continued)

OTHER PUBLICATIONS

English-language abstract of German Patent Application Publication No. 10 2012 003 292 A 1, published Jun. 27, 2013; 2 pages.
(Continued)

*Primary Examiner* — Isaac G Smith
(74) *Attorney, Agent, or Firm* — Sterne, Kessler, Goldstein & Fox, PLLC

(57) ABSTRACT

A method is provided for operating a navigation system of a hybrid motor vehicle having a combustion engine and an electric motor that is fed from an associated battery. In this method, an efficiency route enabling a maximum utilization of the electric motor is determined by the navigation system, where at least one item of efficiency information is considered in the determination of the efficiency route. The efficiency information is provided dynamically by a drive control device of the motor vehicle and is dependent on the current operating state and/or the current operating prediction.

20 Claims, 2 Drawing Sheets

(51) Int. Cl.
*G01C 21/34* (2006.01)
*B60W 50/00* (2006.01)
*B60K 6/48* (2007.10)
*B60L 11/12* (2006.01)

(52) U.S. Cl.
CPC ..... *B60L 15/2045* (2013.01); *B60W 50/0097* (2013.01); *G01C 21/3415* (2013.01); *G01C 21/3469* (2013.01); *B60L 2240/62* (2013.01); *B60W 2550/141* (2013.01); *B60Y 2200/92* (2013.01); *Y02T 10/52* (2013.01); *Y02T 10/56* (2013.01); *Y02T 10/6221* (2013.01); *Y02T 10/7258* (2013.01); *Y02T 10/84* (2013.01); *Y10S 903/93* (2013.01)

(58) Field of Classification Search
USPC .............................................. 701/22, 26, 411
See application file for complete search history.

(56) References Cited

U.S. PATENT DOCUMENTS

| 8,014,914 | B2 | 9/2011 | Boss et al. |
| 9,057,621 | B2 | 6/2015 | Tate, Jr. et al. |
| 2005/0222764 | A1* | 10/2005 | Uyeki ................. G01C 21/3415 701/414 |
| 2009/0182463 | A1* | 7/2009 | Maguire ................. B60K 6/48 701/22 |
| 2009/0192660 | A1* | 7/2009 | Tamor ................. B60L 15/2045 701/22 |
| 2012/0179315 | A1* | 7/2012 | Tate, Jr. ............. G01C 21/3469 701/22 |
| 2015/0217779 | A1 | 8/2015 | Schmoll et al. |

FOREIGN PATENT DOCUMENTS

| DE | 102012003292 A1 | 6/2013 |
| DE | 102012214252 A1 | 2/2014 |
| EP | 1842758 A1 | 10/2007 |

OTHER PUBLICATIONS

International Preliminary Report on Patentability directed to related International Patent Application No. PCT/EP2015/001961, dated Sep. 8, 2016, with attached English-language translation; 13 pages.
International Search Report and Written Opinion of the International Searching Authority directed to related International Patent Application No. PCT/EP2015/001961, dated Jan. 7, 2016, with attached English-language translation; 20 pages.

* cited by examiner

METHOD FOR OPERATING A NAVIGATION SYSTEM OF A HYBRID MOTOR VEHICLE, AND HYBRID MOTOR VEHICLE

TECHNICAL FIELD

The invention relates to a method for operating a navigation system of a hybrid motor vehicle with a combustion engine and an electric motor that is fed from an associated battery. In addition to this, the invention relates to a hybrid motor vehicle.

BACKGROUND

Hybrid motor vehicles are already known in the prior art and utilize two different drive motors that realize different drive concepts. As known from prevalent motor vehicles, on the one hand a combustion engine is thereby typically used that generates the drive power via combustion of fuel from a tank. In addition to the combustion engine, in a hybrid drivetrain an electric motor is also provided that can typically also work in a generative operation and is fed from a battery, typically a high voltage battery. A charging of the battery is also possible via the generative operation of the electric motor, for example via recuperation during a braking process and/or by diverting a portion of the power provided by the combustion engine. Also known in addition to this are what are known as plug-in hybrids, in which a charging device is provided via which the battery may also be charged from an electric grid or the like if the motor vehicle is parked.

Navigation systems with regard to motor vehicles have likewise already been known for a long time. They serve to direct a driver from a current position to a destination via corresponding driving instructions, consequently for route guidance. A route is thereby calculated that directs the motor vehicle to the destination. In order to calculate the optimal route to the destination, a cost function is typically used via which individual route segments—in particular road segments of a digital map—may be evaluated so that it is possible, for example, to realize the discovery of the optimal route as a directed tree search. The cost function consequently determines which optimization goals are considered, where typically multiple optimization goals are incorporated into the cost function with different weighting. Modern navigation systems therefore often have various modes that ultimately determine which optimization goal the driver considers most important. In a "fastest route" mode, for example, the optimal route is determined via which the driver of the motor vehicle most quickly reaches his destination. An analogous mode exists for a "shortest route"; in addition to this, recently modes have also become known that determine the most efficient route, in particular with regard to the consumption of the motor vehicle and/or its pollutant emissions. A vehicle model is thereby typically used that, for example, includes information about the consumption, the mass of the motor vehicle and the like, for example so that a route of least consumption may be set as an efficiency route, where naturally other efficiency criteria, for example an optimally low emission of pollutants, may also be set.

If a route to be driven has been determined, this is typically also transmitted—in particular in hybrid motor vehicles—to the drive control device controlling the components of the drivetrain, which drive control device uses the known future route in order to predictively plan and optimize a suitable operating strategy, in that predictive consumption on the selected route is determined in particular.

It is thereby problematic that, on the one hand, the navigation systems access the same input data set, in particular with regard to the mentioned vehicle model, for all motor vehicles in the determination of the optimal route. Details of specific motor vehicles are thus not taken into account. The current state of the hybrid motor vehicle, in particular of the drivetrain, is also considered in neither the determination of the optimal route nor the route guidance. Because the properties of the drivetrain, in particular with regard to the consumption, may change dynamically, in particular with regard to efficiency routes, it is not ensured that the ideal solution is always found. In particular, possibilities for charging the battery in hybrid motor vehicles can for the most part only be poorly planned in advance, or these do not enter at all into the determination of the efficiency route.

BRIEF DESCRIPTION OF THE DRAWINGS/FIGURES

DETAILED DESCRIPTION

Figure 1:
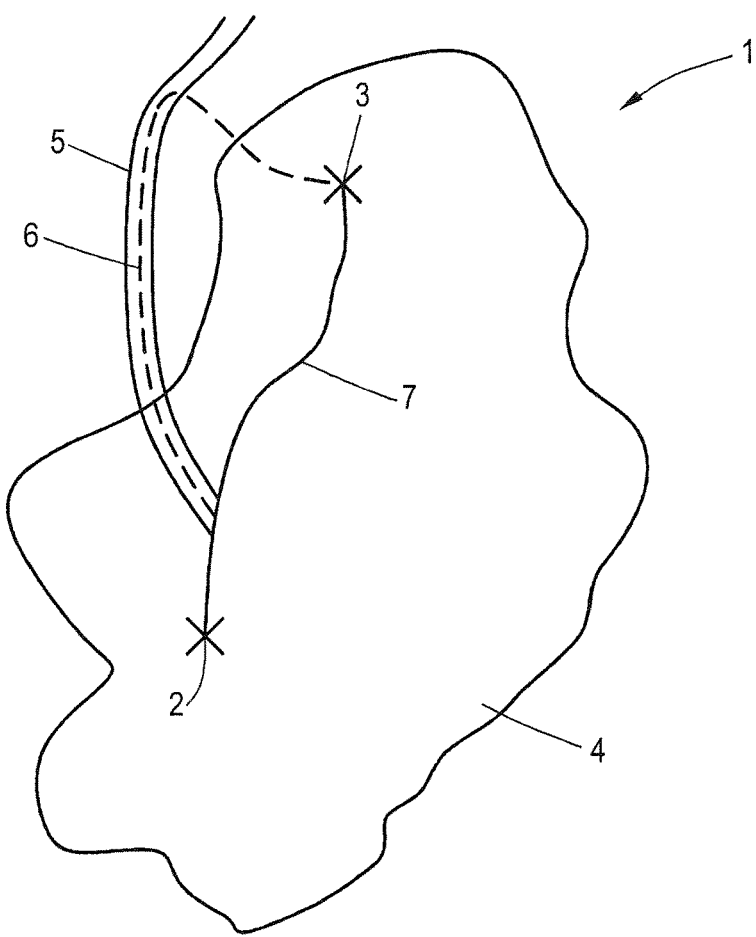
FIG. 1 illustrates a schematic diagram for the determination of an efficiency route.

The invention is therefore based on the object to specify an improved determination of efficiency routes for hybrid motor vehicles, in particular plug-in hybrid motor vehicles.

To achieve this object, in a method of the aforementioned type it is provided according to the invention that an efficiency route enabling a maximum utilization of the electric motor can be determined, where at least one item of efficiency information that is dynamically provided by a drive control device of the motor vehicle, that is dependent on the current operating state and/or is dependent on a current operating prediction is taken into account in the determination of the efficiency route.

According to the invention, it is thus proposed to consider the current operating state of the motor vehicle, in particular of the hybrid drivetrain, in that a suitable feedback capability from the drive control device to the navigation control device of the navigation system is provided, for example a corresponding communication channel that may be realized via a bus system of the motor vehicle. In this way, not only the drive variant, here the presence of a hybrid drivetrain, but rather also its current properties or the effects on the future operation (current operating prediction) are considered for the calculation of the optimal efficiency route in the navigation system. In this way, general and current properties of the drivetrain may be taken into account on the part of the navigation system with distinct improvement in order to enable it to actually maximize the (relative or absolute) proportion of the exclusively electric driving, thus of the driving solely with the electric motor, where changes during the route guidance, for example changes in an operating prediction due to more precise data that are now present, may be better reacted to.

This is based on the realization that customers who choose a hybrid motor vehicle, in particular a plug-in hybrid, often do this with regard to a maximum driving experience in terms of electric driving, consequently would like to maximize the proportion of exclusively electric driving and ideally want to cover the entire route with electric driving capability. However, an optimal efficiency route with regard to achieving a maximum proportion of exclusively electric driving can then particularly advantageously be realized precisely when the most current information about the state and the operation planning of the hybrid drivetrain is always present.

In this way, not only is the electric driving experience increased but the carbon dioxide emissions or also the emission of other pollutants in driving operation may also be decreased. Consequently, the present invention offers the possibility to couple the navigation system with the drive control device such that an improved route calculation and route guidance are possible, in particular with regard to maximum, exclusively electric driving.

Explained briefly in detail in the following, using examples, are the general advantages of an operating mode of the navigation system in which an efficiency route in which a maximum proportion of the driving is realized solely with the electric motor is determined under consideration of properties of the hybrid drivetrain. For example, if a route from the airport in Munich to the inner city should be covered with a plug-in hybrid motor vehicle, a prevalent optimization for a fastest route would lead to a drive route of 40 km that is covered in 30 minutes but in which driving exclusively with only the electric motor is not possible; rather, the combustion engine must be ignited on the highway due to high driving performance, and the battery charge is not sufficient for the entire route. In city traffic, starts of the combustion engine are possibly even necessary in order to recharge the battery. For example, given this fastest route only 75% can be driven emissions-free with the electric motor, whereas 25% of the route must be conducted with the combustion engine. In a modified determination in which the cost function targets maximum driving solely with the electric motor, under consideration of the properties of the hybrid drivetrain, in this case the current efficiency information, an efficiency route is discovered in which a drive time of 33 minutes is required for a route of 38 km, but driving exclusively with the electric motor, consequently a maximum electric driving experience on the part of the driver, is enabled over the entire route and 100% of the route is driven without emissions.

A second example relates to inner city traffic if the battery is completely discharged. If a fastest route were determined in a known manner, driving exclusively with the electric motor would not come under consideration since charging of the battery by the combustion engine is possible in only an extremely limited and inefficient manner in stop-and-go inner city traffic. However, if the route is only slightly modified, although it is naturally still not possible to drive solely with the electric motor over the entire route, route segments on which charging of the battery is efficiently possible via the combustion engine may, for example, specifically be selected via the use of main roads/expressways (for example ring roads). The energy stored in this way in the battery may then be used for exclusively electric driving on the last, inner city part of the efficiency route, for example, an electric driving proportion of 20% relative to 0% before may consequently be achieved. This example makes it particularly clear how strongly the consideration of the possibility of charging the battery from the electric motor, as is possible in hybrid motor vehicles, positively affects the determination of the most efficient, optimal routes.

A particularly advantageous embodiment of the present invention consequently also provides that at least one item of efficiency information is used, which relates to a charging process of the battery via the combustion engine. The possibility of charging the battery from the combustion engine exists only in hybrid drivetrains in hybrid motor vehicles, and at a first glance does not work especially efficiently. However, tests have shown that it may by all means be expedient, given specific route paths, to provide charging phases on route segments that increase the total efficiency of the route, and this is not necessarily only with regard to a maximum driving experience solely with the electric motor. Efficiency parameters that describe the possibility of charging the battery and its efficiency may already be provided to the navigation system as basic input parameters; however, it is also possible, as will be discussed in further detail, to react dynamically during the route guidance if, for example, the consumption on past route segments was higher than predicted, or higher than calculated in the determination of the efficiency route, such that an adaptation of the efficiency route for the future with insertion of a charging segment may be expedient, and the like. Consequently, the possibility of charging the battery from the combustion engine particularly distinctly indicates a flexibility in the hybrid drivetrain that has not yet been sufficiently taken into account up to this point in route planning in navigation systems and, via the efficiency information, may be included in an improved determination of an efficiency route.

In a first embodiment of the method according to the invention, it may be provided that an efficiency parameter set to be considered in the determination of the efficiency route, the efficiency parameter set including positive and negative consumptions of the combustion engine and of the electric motor, and/or requirements for efficiency parameters describing the route planning, is used as efficiency information, which efficiency parameter set is updated by the drive control device and provided to the navigation system at least given a change to an efficiency parameter due to the current operating state and/or the current operating prediction. In this way it should be ensured that the most current properties of the hybrid drivetrain, described by the efficiency parameters, are always provided in the determination of efficiency routes, be it in the original planning or in a dynamic adaptation. Consumption properties and other efficiency parameters may necessarily be dependent on the operating state, for example because a dependency exists on how long the respective motor has already been running and/or what external temperature is present. Other effects, for example a necessary start of the combustion engine in order to enable a remainder consumption or the like, may also be mapped via the efficiency parameters.

A particularly expedient embodiment thereby provides that the route that can be traversed with the current energy content of the battery given utilization of only the electric motor, broken down according to road class, and/or the route that is additionally achievable by charging the battery by means of the combustion engine per route unit, broken down by road class, and/or efficiency parameters describing preferred route segments, in particular with regard to their length and properties, are used as efficiency parameters. For example, city traffic, rural roads and highways may thereby be differentiated as road classes with which corresponding consumption/efficiency information can be mostly associated. The efficiency parameter set may be designated as a type of basis that should in particular be provided even in the first determination of an efficiency route, meaning before it was possible to determine a predictive operating strategy or the like, for example on the part of the drive control device, based on a known efficiency route, consequently before more detailed information may be present about current operating states during the route guidance and/or predicated operating states on the efficiency route. Naturally, the efficiency parameters are also additionally considered in the additional calculations, for example given an adaptation of the efficiency route which may be triggered due to changes in the traffic situation where, as was described, they may always be kept current. If changes in this regard thus occur, in particular also changes exceeding a threshold, updated efficiency parameters are accordingly provided to the navigation system, thus in particular are transferred from the drive control device to the navigation control device.

Efficiency parameters describing route segments may thereby particularly relate to a route segment situated at the beginning of the efficiency route, in particular as pertains to a warm-up phase. Ultimately, these efficiency parameters thus relate to route segments preferred by the drive control device, such that, for example, it may be specified that it is desired to locate at least one route segment of 1 km in length that is free of intersections and traffic lights within the first five kilometers. In this way, a particularly efficient and advantageous warm-up of the combustion engine and/or of the electric motor is possible.

In a specific embodiment, the following efficiency parameters may thus already have been provided to the navigation control device of the navigation system as essential information, in the form of the efficiency parameter set, before the first calculation of the efficiency route: the drive route that can be covered exclusively electrically with the current energy content in the battery, for example 10 km in city traffic, 20 km on rural road and 5 km on the highway; the additional distance that can additionally be covered solely with the electric motor that might be generated via charging of the battery with the combustion engine, for example 0 meters distance per kilometer of city traffic, 100 meters distance per kilometer of rural road and 50 meters distance per kilometer of highway. Information regarding the warm-up phase is included as a third group of efficiency parameters, for example the desire for a 1 kilometer-long route segment without intersections and traffic lights. During the additional operation of the navigation system, the efficiency parameters in the navigation control device are continuously kept current so that recalculations of the efficiency route are also always based on the current status and prediction data. It is noted that a classification into road classes (road types) that is also used in digital map material of the navigation system is expediently used in the classification into road classes.

A second embodiment, which can be used together with the first embodiment, provides that a predictive operating strategy for an efficiency route provided by the navigation system, in particular depending on the current operating state, is determined on the part of the drive control device, where at least one of the at least one items of efficiency information is determined depending on the predictive operating strategy. This means that the current predictive operating strategy that was determined in the drive control device of the known efficiency route may be used as the aforementioned operating prediction, which in particular enables feedback to be particularly advantageously provided to the navigation system on the part of the drive control device, in particular as pertains to the feasibility and/or improvement potential of the current efficiency route.

A particularly advantageous development thus provides that, given a provided efficiency route that cannot be entirely driven electrically, in particular on the basis of the current predictive operating strategy, an adaptation request information including at least one starting point for increasing the portion drivable solely with the electric motor is determined as efficiency information via a route analysis depending on the predictive operating strategy, and is provided to the navigation system. In other words, this means that, upon receiving an efficiency route and in particular also during an ongoing drive routing, it is possible on the part of the drive control device to report to the navigation system that the current efficiency route is not optimal for the hybrid drivetrain at least at one location, such that the navigation system may calculate a more optimal efficiency route in dynamic recalculations, in particular due to the traffic situation or upon direct request by the drive control device. It may thereby be concretely provided that the starting point pertains to an extension and/or addition of a route segment suitable for charging the battery from the electric motor, and/or a shortening and/or the omission of a route segment that cannot be driven solely with operation of the electric motor. For example, if it is established in the drive control device that, given the current route guidance the energy present in the battery is no longer sufficient in order to reach the destination exclusively via electric driving, for example given a concluding drive in city traffic, for example because the operating state has changed and/or consumption in the past was greater than assumed, and if the drive control device simultaneously recognizes that a highway or rural road segment provided for charging was present in any event, it may suggest shifting a departure from the highway or rural road by one exit in order to obtain more energy in the battery. Such a starting point may then be reviewed by the drive control device so that a route with extended highway or rural road segment possibly results, of which a greater proportion (relative or absolute) may then, however, be driven electrically. Naturally, it is also conceivable that it is established that a very large amount of power is present in the battery, consequently that an earlier exit from the highway may be taken and the like. Clearly, within the scope of the determination and evaluation of the predictive operating strategy in various situations, starting points may be discovered that may indicate a possible optimization of the efficiency route. These are then accordingly provided to the navigation control device of the navigation system.

As was already indicated, it may be provided that, upon receiving an adaptation request information, the navigation system immediately begins a recalculation of the efficiency route under consideration of the adaptation request information, or considers the adaptation request information in a recalculation of the efficiency route that is otherwise triggered, where an efficiency route that is determined under consideration of the adaptation request information is used when a greater proportion of it may be driven using solely the electric motor, in comparison to a route determined without consideration of the adaptation request information. It may consequently be provided, to establish whether an efficiency route determined under consideration of the starting points is assessed as more optimal than another efficiency route, for example the previous efficiency route, because the recalculated efficiency route was determined under consideration of the starting points of the adaptation request information. This may be triggered via the receipt of the adaptation request information itself, although it is also conceivable to only consider this adaptation request information in a recalculation initiated for a different reason, for example given an altered traffic situation. It is thereby noted that, naturally, additional criteria that pertain to comfort may be considered in the described comparison of the efficiency routes with or without consideration of the starting point, for example with regard to a possibly modified cost function that is used anyway, which means that an efficiency route that is modified with regard to an adaptation request information may be undesirable—in spite of the fact that it can now be entirely driven exclusively electrically if, for example, it takes twice as much time or the like. An expedient development consequently provides that the efficiency route determined under consideration of the adaptation request information, the efficiency route deviating from the efficiency route determined without consideration of the adaptation request information, is checked against at least one comfort criterion that likewise specifically compares both efficiency routes prior to use. In this way, detours that are too large or drives that are too long, that may also be unwanted on the part of the driver, are avoided.

At this point, it is thereby additionally noted that, for consideration of the starting points included in the adaptation request information it may, for example, be provided to adapt boundary conditions in the determination of the efficiency route and the like. For example, it may necessarily be required to only depart from the highway at a later exit and the like. Corresponding modifications in the determination of optimal routes, in particular efficiency routes, are already known in principle and therefore do not need to be explained in detail here.

In addition to the method, the invention also concerns a hybrid motor vehicle comprising a hybrid drivetrain having an electric motor and a combustion engine; a battery to feed the electric motor; a navigation system with a navigation control device and a drive control device, which control devices are designed to execute the method according to the invention. All embodiments relating to the method according to the invention can be analogously transferred to the motor vehicle according to the invention, with which the advantages already cited may consequently be achieved. In particular, it is also enabled for the motor vehicle according to the invention to improve the route planning via the use of current efficiency information of the drive control device, and for the drive control device to provide feedback with regard to the efficiency route, in particular based on a predictive operating strategy.

Figure 2:
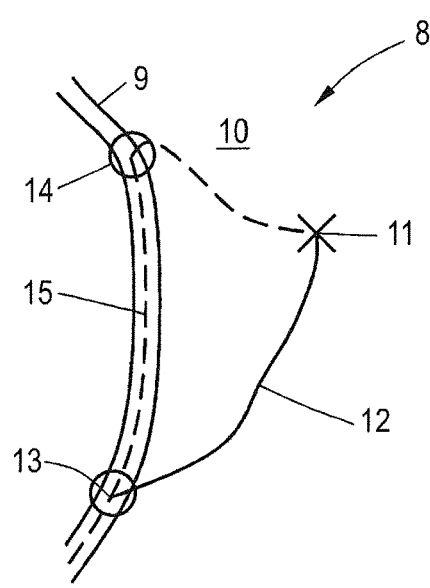
FIG. 2 illustrates a schematic diagram regarding an occurring adaptation request.
Figure 3:
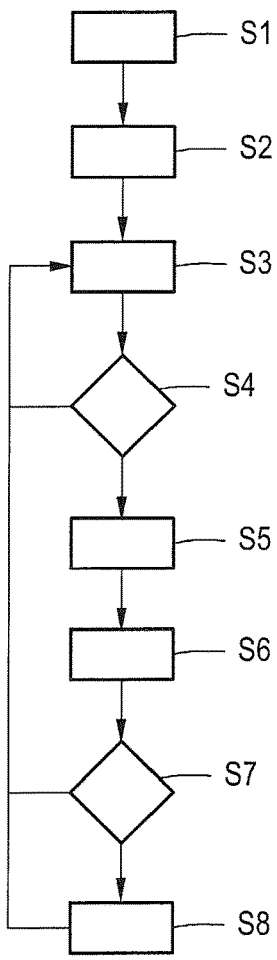
FIG. 3 illustrates a flow chart of an exemplary method according to one embodiment of the disclosure.
Figure 4:
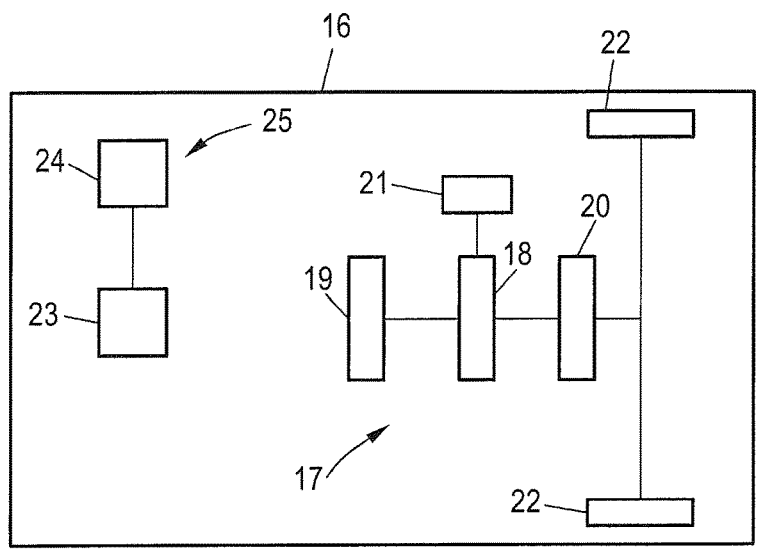
FIG. 4 illustrates a schematic representation of a motor vehicle.

Additional advantages and details of the present invention are shown in the embodiments described hereinafter and from the drawing. The following is shown:

FIG. 1 a diagram for the determination of an efficiency route,

FIG. 2 a diagram regarding an occurring adaptation request,

FIG. 3 a flow chart of an exemplary embodiment of the method according to the invention, and FIG. 4 is an inventive motor vehicle.

The method according to the invention deals with the determination and updating of an efficiency route from a current position of a hybrid motor vehicle to a destination, which efficiency route enables a maximum utilization of the electric motor and may in particular also be dynamically adapted. The determination and dynamic adaptation of the efficiency route is thereby based on efficiency information transmitted from the drive control device of the motor vehicle, which controls the components of the hybrid drivetrain with the electric motor and the combustion engine, to the navigation control device of the navigation system, which efficiency information is dependent on the current operating state, in particular of the hybrid drivetrain, and, if present, on the current operating prediction. The concept of the efficiency route in general is first explained in detail with regard to FIG. 1, which shows a significantly simplified map excerpt 1 that illustrates the possibilities to arrive at a destination 3 from a current position 2 of the motor vehicle. The region 4 thereby indicates a proportion of the road network that is classified as city traffic. A highway segment 5 is also apparent. FIG. 1 now shows two possible routes 6, 7 in order to arrive at the destination 3 from the current location 2. Both routes 6, 7 travel identically at the beginning, where the conventional route 6 (determined as the fastest route) uses the highway segment 5, however, in order to arrive at the destination 3 more quickly. However, on the highway it is not possible to operate the motor vehicle exclusively with the electric motor, such that the fastest route 6 includes route segments in which the combustion engine of the motor vehicle is used.

The route 7 was determined with the method according to the invention such that a maximum utilization of the electric motor is enabled, so that this efficiency route 7 is presently even to be exclusively covered in its entirety with the electric motor due to the city traffic in region 4 and a sufficient charge status of the battery, consequently offering the maximum electric driving experience. The drive along efficiency route 7 thereby lasts only insignificantly longer than the drive along the fastest route 6. Because the efficiency route 7 was also determined on the basis of current efficiency information, it is additionally reliable since this determination incorporates not only that a hybrid drivetrain is present, but also what operating properties this hybrid drivetrain has under the current conditions.

In particular, in the determination of general efficiency routes it is thereby also considered that it is possible to charge the battery during driving, in particular on rural road and highway segments. In this way, a new energy supply in the battery may be achieved in order to achieve a greater relative or absolute proportion that may be managed exclusively with the electric motor. If an efficiency route, for example the efficiency route 7, is determined first, it is relayed to the drive control device, where a predictive operating strategy that optimally utilizes the components of the hybrid drivetrain is determined for this efficiency route. It may hereby occur already, or also due to later changes to the operating state, for example higher consumption than assumed, or temperature change, that optimization potential for the efficiency route is recognized by the drive control device. This is depicted in detail using the example in FIG. 2.

Depicted there in turn is a significantly simplified map excerpt 8 that shows an additional highway segment 9 that in this instance leads completely through a region 10 classified as city traffic. The destination 11 that is considered in this example is also situated within the region 10. The previously calculated efficiency route 12 now provides to turn off at a highway exit 13 and reach the destination 11 in city traffic.

If in its calculations the drive control device, in particular within the scope of the predictive operating strategy, now establishes that the energy gained in charging the battery on the highway segments is, contrary to the original expectation, not sufficient to manage the segment leading through the region 10 in city traffic, a feedback with a concrete adaptation request may be passed to the navigation control device of the navigation system. In the present case, it might be suggested to extend the route segment along the highway segment 9 up to the next exit 14, see the dashed route 15, in order to obtain a greater amount of energy in the battery, which enables it to manage a modified route segment through the city traffic in region 10 without additionally activating the combustion engine. Accordingly, in this instance an adaptation request information is transmitted as efficiency information to the navigation control device, which receives the starting point to extend the highway operation beyond the exit 13. The navigation control device utilizes this adaptation request information in a recalculation of the efficiency route 12 in that the drive should continue up to the exit 14 as a boundary condition, such that now the dashed route 15 may now be completely defined. If this modified route 15, as a new efficiency route, actually enables the city traffic to be entirely driven only with the electric motor, and the detour does not take markedly longer, the route 15 is also used as a new efficiency route in the route guidance; however, if no route 15 results that is improved relative to the efficiency route 12, an adaptation is foregone and corresponding feedback is passed to the drive control device, if necessary.

FIG. 3 shows, in a more general formulation than the two cited examples, a flow chart of an exemplary embodiment of the method according to the invention as it may be implemented jointly by the navigation control device and the drive control device. In a step S1, efficiency information in the form of an efficiency parameter set that includes basic, current efficiency parameters that are important for the determination of the efficiency route has already been provided by the drive control device to the navigation control device before a first determination of an efficiency route. Even if it is not explicitly shown in FIG. 3, these efficiency parameters are in principle kept current, which means that these are immediately provided again in current form to the navigation control device given a change.

In the present case, the efficiency parameters include the exclusively electric drive route that can be covered with the current charge state of the battery, broken down according to road type (city traffic, rural route, highway), the exclusively electric drive route that may additionally be generated via charging with the combustion engine, again broken down per kilometer of road class, and also efficiency parameters that represent requirements or requests for route segments in the warm-up phase, for example a part of one kilometer in length that is free of intersections and traffic lights along the first five kilometers, if possible.

Under consideration of these efficiency parameters, in step S2 a first efficiency route is calculated and provided in turn to the drive control device. Based on the efficiency route that is now present, in step S3 the drive control device determines a predictive operating strategy from which starting points are possibly already apparent within the scope of a route analysis, which starting points indicate an optimization potential of the efficiency route where, because the predictive operating strategy is likewise continuously kept current, such an optimization potential may also only arise in the further course of time, during the route guidance. Consequently, in a step S4 it is checked whether such an optimization potential is seen, consequently whether starting points are seen for an improvement of the efficiency route by the drive control device; see also in this regard the description regarding FIG. 2. If this is the case, in a step S5 these starting points are transmitted as adaptation request information, thus a special type of efficiency information, to the navigation control device. In step S6, this navigation control device calculates, under consideration of the at least one starting point, a new efficiency route that is compared with the previous efficiency route or an efficiency route that is likewise newly determined without consideration of the starting point as to whether an improvement is achieved with regard to the maximum utilization of the electric motor without thereby violating comfort criteria that, for example, may relate to the drive time. If this is not the case, thus if the old efficiency route is still the most suitable, a corresponding feedback is passed to the drive control device and the workflow continues further in step S3, where naturally this starting point is now deemed in step S4 to no longer be relevant, or to no longer be relevant for a predetermined time period.

However, if it was established in step S7 that the efficiency route newly determined under consideration of the starting point is more advantageous, for example, thus the drive should actually continue up to the exit 14 in the example of FIG. 2, the new efficiency route is used for route guidance and is also relayed in step S8 to the drive control device, which determines a new predictive operating strategy and naturally continues to monitor whether optimization potential is present.

It is noted that, naturally, a dynamic recalculation of the efficiency route by the navigation control device may also take place independently of an adaptation request information, where naturally the most current efficiency parameters and other efficiency information are also always considered in this context. For example, this may occur if new traffic situation information and the like are received, as is generally known. Whenever a new efficiency route is used for route guidance, this is naturally also provided to the drive control device.

FIG. 4 finally shows a schematic diagram of an inventive motor vehicle 16. This is a hybrid motor vehicle 16, meaning that it has a hybrid drivetrain 17 (schematically shown) with an electric motor 18, a combustion engine 19 and a transmission 20. The electric motor 18 is fed from a battery 21 and may also be utilized in a generative operation in order to charge the battery 21, be it from power coming from wheels 22 upon braking or rolling down a hill, or via the power of the combustion engine 19.

A drive control device 23 is provided to control the components of the hybrid drivetrain 17. This is linked, for example via a bus system of the motor vehicle, to a communication connection with a navigation control device 24 of a navigation system 25 of the motor vehicle 16, such that routes used for route guidance, in particular efficiency routes, may be transferred from the navigation control device 24 to the drive control device 23 and efficiency information may be transferred from the drive control device 23 to the navigation control device 24. The control devices 23, 24 are designed to jointly implement the method according to the invention.

The invention claimed is:

1. A method for operating a navigation system of a hybrid motor vehicle having a combustion engine and an electric motor that is fed from an associated battery, the method comprising:

receiving, dynamically from a drive control device of the motor vehicle, efficiency information, wherein the efficiency information is based on a current operating state or a current operating prediction;

determining, by the navigation system, an efficiency route enabling a maximum utilization of the electric motor based on at least one item of the efficiency information;

determining a predictive operating strategy for the efficiency route based on the current operating state; and updating the at least one item of the efficiency information based on the predictive operating strategy.

2. The method of claim 1, wherein the at least one item of the efficiency information is associated with a charging process of the battery via the combustion engine.

3. The method of claim 1, wherein the efficiency information comprises an efficiency parameter set, and further comprising:
determining the efficiency route based on the efficiency parameter set, wherein the efficiency parameter set comprises consumption values of the combustion engine and of the electric motor, and the efficiency parameter set is updated by the drive control device and is provided to the navigation system based on a change to an efficiency parameter in the efficiency parameter set due to the current operating state or the current operating prediction.

4. The method of claim 3, wherein an efficiency parameter of the efficiency parameter set comprises a route that can be traversed with current energy content of the battery given utilization of only the electric motor, broken down according to a road class, or a route that is achievable by charging the battery by means of the combustion engine per route unit, broken down by road class, or preferred route segments along with associated lengths and properties of the preferred route segments.

5. The method of claim 1, further comprising:
in response to determining the efficiency route cannot be entirely driven electrically, determining adaptation request information based on a route analysis of the efficiency route and the predictive operating strategy, wherein the adaptation request information comprises a starting point that is determined to increase a portion of the efficiency route drivable solely with the electric motor; and
receiving, by the navigation system, the adaptation request information.

6. The method of claim 5, wherein the starting point is associated with an extension or an addition of a route segment suitable for charging the battery from the electric motor, or a shortening or an omission of a route segment that cannot be driven solely with operation of the electric motor.

7. The method of claim 5, further comprising:
recalculating the efficiency route, by the navigation system, based on the adaptation request information; and
using the recalculated efficiency route if a greater proportion of the recalculated efficiency route is driven using solely the electric motor compared to the efficiency route determined without the adaptation request information.

8. The method of claim 7, further comprising:
checking the recalculated efficiency route against at least one comfort criterion associated with a drive time, wherein the recalculated efficiency route deviates from the efficiency route determined without the adaptation request information.

9. A hybrid motor vehicle, comprising:
a hybrid drivetrain comprising an electric motor and a combustion engine;
a battery to feed the electric motor; and
a navigation system comprising a navigation control device and a drive control device, wherein the navigation system and the drive control device are configured to:
dynamically provide efficiency information, wherein the efficiency information is based on a current operating state or a current operating prediction;
determine an efficiency route enabling a maximum utilization of the electric motor based on at least one item of the efficiency information;
determine a predictive operating strategy for the efficiency route based on the current operating state; and
update the at least one item of the efficiency information based on the predictive operating strategy.

10. The hybrid motor vehicle of claim 9, wherein the at least one item of the efficiency information is associated with a charging process of the battery via the combustion engine.

11. The hybrid motor vehicle of claim 9, wherein the efficiency information comprises an efficiency parameter set, and wherein the navigation system and drive control device are further configured to:
determine the efficiency route based on the efficiency parameter set, wherein the efficiency parameter set comprises consumption values of the combustion engine and of the electric motor; and
update the efficiency parameter set and provide it to the navigation system based on a change to an efficiency parameter in the efficiency parameter set due to the current operating state or the current operating prediction.

12. The hybrid motor vehicle of claim 11, wherein an efficiency parameter of the efficiency parameter set comprises a route that can be traversed with current energy content of the battery given utilization of only the electric motor, broken down according to a road class, or a route that is achievable by charging the battery by means of the combustion engine per route unit, broken down by road class, or preferred route segments along with associated lengths and properties of the preferred route segments.

13. The hybrid motor vehicle of claim 9, wherein the navigation system and drive control device are further configured to:
in response to determining the efficiency route cannot be entirely driven electrically, determine adaptation request information based on a route analysis of the efficiency route and the predictive operating strategy, wherein the adaptation request information comprises a starting point determined to increase a portion of the efficiency route drivable solely with the electric motor; and
receive the adaptation request information.

14. The hybrid motor vehicle of claim 13, wherein the starting point is associated with an extension or an addition of a route segment suitable for charging the battery from the electric motor, or a shortening or an omission of a route segment that cannot be driven solely with operation of the electric motor.

15. The hybrid motor vehicle of claim 9, wherein the navigation system and drive control device are further configured to:
recalculate the efficiency route based on the adaptation request information; and
use the recalculated efficiency route if a greater proportion of the recalculated efficiency route is driven using solely the electric motor in comparison to the efficiency route determined without the adaptation request information.

16. The hybrid motor vehicle of claim 15, wherein the navigation system and drive control device are further configured to check the recalculated efficiency route against at least one comfort criterion associated with a drive time, wherein the recalculated efficiency route deviates from the efficiency route determined without the adaptation request information.

17. The method of claim 1, wherein the determining the predictive operating strategy for the efficiency route further comprises:
    determining a starting point along the efficiency route based on the current operating state, wherein the determined starting point is associated with an addition of a route segment suitable for charging the battery from the electric motor, or an omission of a route segment that cannot be driven solely with operation of the electric motor.

18. The method of claim 17, wherein the updating the at least one item of the efficiency information based on the predictive operating strategy further comprises:
    updating the at least one item of the efficiency information based on the determined starting point.

19. The hybrid motor vehicle of claim 9, wherein the navigation system and drive control device are further configured to:
    determine a starting point along the efficiency route based on the current operating state, wherein the determined starting point is associated with an addition of a route segment suitable for charging the battery from the electric motor, or an omission of a route segment that cannot be driven solely with operation of the electric motor.

20. The hybrid motor vehicle of claim 19, wherein the navigation system and drive control device are further configured to:
    update the at least one item of the efficiency information based on the determined starting point.

* * * * *